United States Patent [19]

Persson

[11] Patent Number: 4,592,451
[45] Date of Patent: Jun. 3, 1986

[54] BRAKE LINKAGE FOR VEHICLE FRICTION BRAKES
[75] Inventor: Erling R. Persson, Staffanstorp, Sweden
[73] Assignee: Knorr-Bremse GmbH, Munich, Fed. Rep. of Germany
[21] Appl. No.: 633,326
[22] Filed: Jul. 23, 1984
[30] Foreign Application Priority Data Jul. 21, 1983 [DE] Fed. Rep. of Germany ....... 3326374

[51] Int. Cl.⁴ ............................................ F16D 65/56
[52] U.S. Cl. ..................................... 188/71.9; 188/59; 188/72.9; 188/107; 188/196 P
[58] Field of Search ................. 188/107, 203, 197, 59, 188/72.9, 196 P, 196 BA, 196 V, 71.9, 196 F, 196 D, 199, 200, 347, 348

[56] References Cited
U.S. PATENT DOCUMENTS 2,485,815 10/1949 Cook .................................... 188/107
3,109,517 11/1963 Butler et al. ....................... 188/59 X
3,659,685 5/1972 Stipanovic ........................ 188/59 X

FOREIGN PATENT DOCUMENTS 7006455 2/1970 Fed. Rep. of Germany .

Primary Examiner—Bruce H. Stoner, Jr.
Assistant Examiner—Michael P. Gilday
Attorney, Agent, or Firm—Pollock, Vande Sande & Priddy

[57] ABSTRACT

Brake linkage for vehicle friction brakes is actuated by a brake power motor (6) and comprises a vent play regulator (10) having an adjustment element driven by an auxiliary motor (14). At the start of braking, the auxiliary motor (14) is actuated in advance of the brake power motor (6), causing application of the vehicle friction brake through the adjustment element. The brake power motor is then activated and tightly clamps shut the friction brake. The brake linkage is particularly suitable as a brake clamp (5) for disc brakes, the vent play regulator then being integrated into the pull rod (11).

14 Claims, 9 Drawing Figures

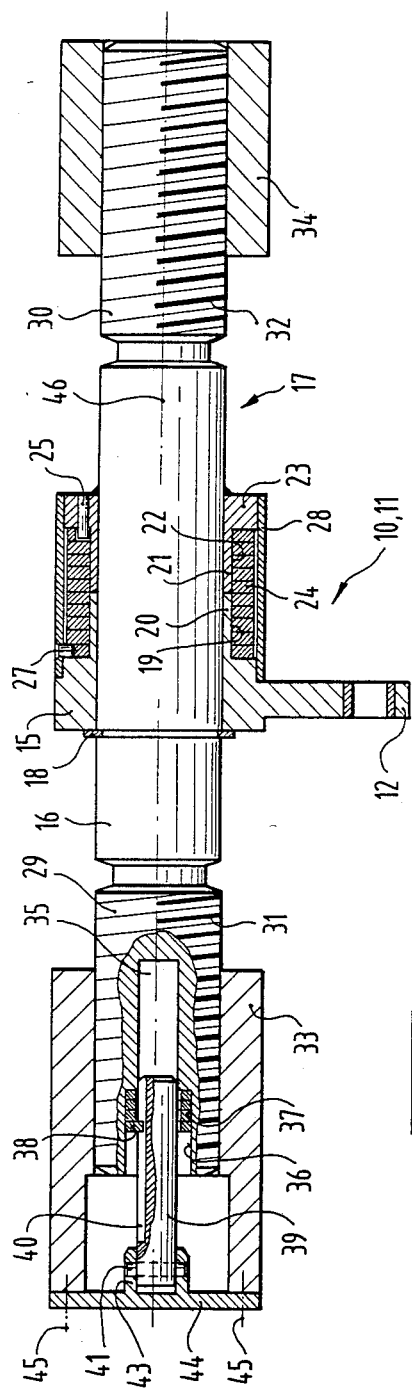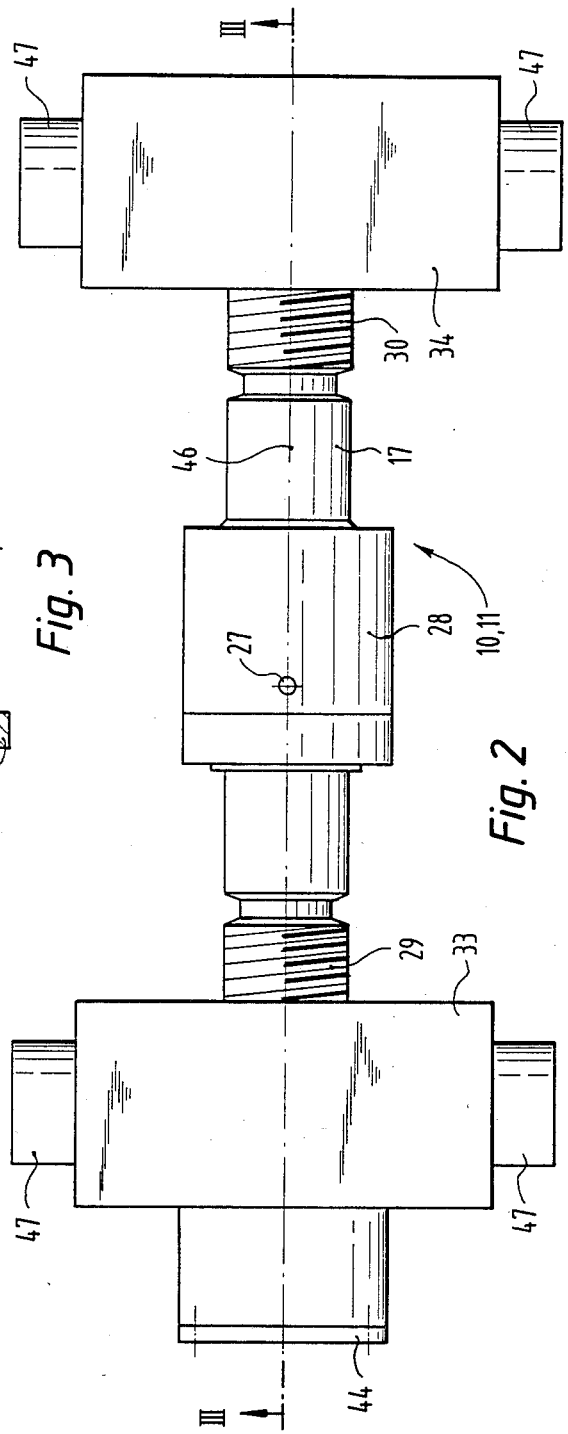
Fig. 3
Fig. 2

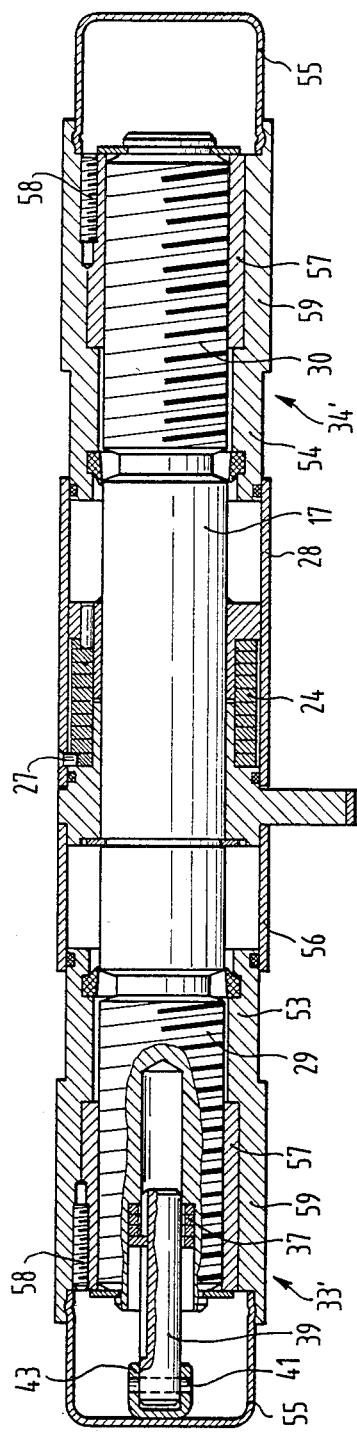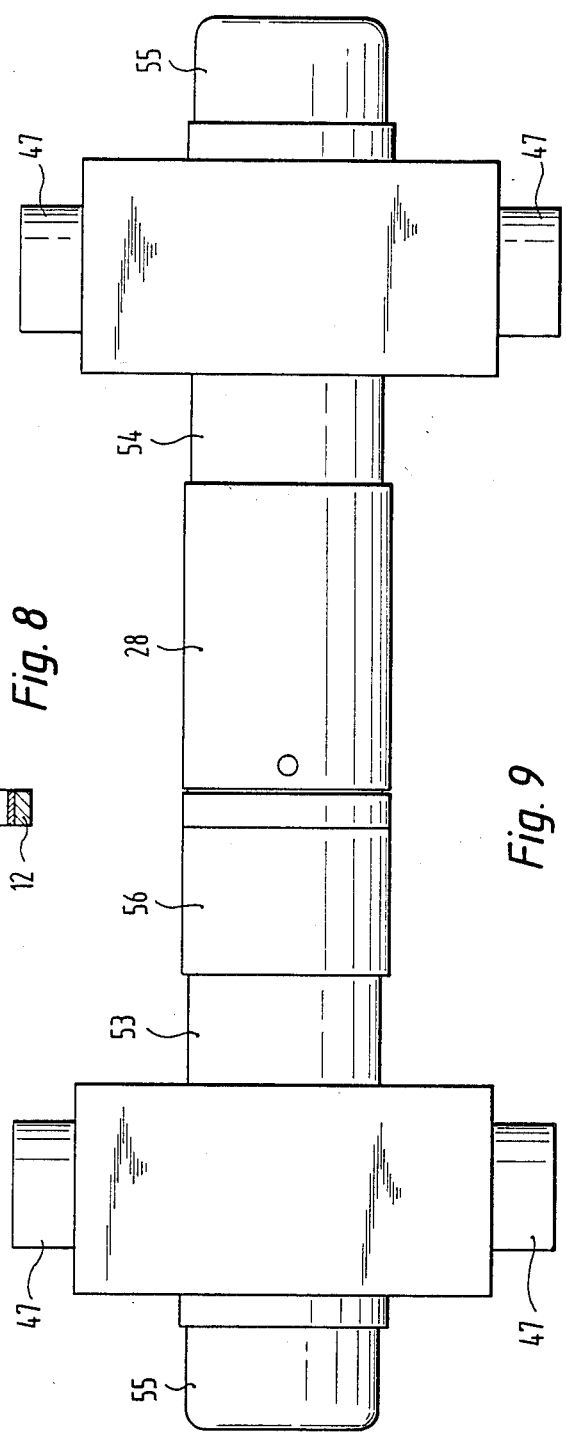
Fig. 8
Fig. 9

BRAKE LINKAGE FOR VEHICLE FRICTION BRAKES

FIELD OF THE INVENTION

The present invention relates to a brake linkage for vehicle friction brakes having a vent play regulator arranged between two brake linkage elements and being longitudinally adjustable and pressure or vacuum loadable through the brake clamping force of a brake power motor. More specifically, it relates to a brake clamp for rail vehicle disc brakes having a pull rod configured as a vent play regulator, the latter having an adjustment element which, when a predetermined vent tolerance is exceeded, is driven by an auxiliary motor to reduce the amount of venting.

BACKGROUND OF THE INVENTION

Brake linkages of this type are known from British Pat. No. 845,806 in the form of a brake power motor and auxiliary motor formed as separate pressure air cylinders, but are suitable only for a block brake unit of rail vehicles. A similar structure is known from German Pat. No. 23 46 828, in this case with a common pressure air cylinder for both the brake power motor and the auxiliary motor, and suited for brake clamps for rail vehicle disc brakes as well as for block brake units.

In the British patent, clamping of the vehicle friction brake is achieved with the aid of an eccentric drive movable by the pressure air cylinder serving as brake power motor, the bearing location of this drive being adjustable by the vent play regulator. The latter is provided with a screw drive with a threaded spindle and a nut threaded thereon, this screw drive being screwable on a ratchet drive serving as a one-way coupling. The pressure air cylinder serving as brake power motor is directly loaded with pressurized air corresponding in pressure to the desired degree of braking.

If the piston of this pressure air cylinder passes a certain distance of travel during braking, it then slides past an opening leading to the inlet chamber of the pressure air cylinder serving as auxiliary motor, so that the latter, too, is now impacted by the brake pressure air, is displaced during idling against spring force, and upon succeeding brake pressure air reduction during brake release causes adjustment of the vent play of the friction brake.

In the case of this brake linkage, the large cross-sectioned pressure air cylinder serving as brake power motor must carry out a stroke via translation of the brake linkage which causes both brake venting and brake clamping. The stroke is thus relatively large, so that this brake cylinder must be of large size, requires a corresponding structural volume and, during braking, a corresponding large, non-recoverable amount of pressurized air, i.e., amount of energy, for clamping of the friction brake. Moreover, this prior art structure provides for only an incremental adjustment of the stroke of the vent play of the friction brake, dependent on the stroke of the brake power pressure air cylinder, so that, upon alteration of the brake linkage translation ratio, often required in order to adapt the brake linkage to the vehicle to be equipped, the position of the channel openings in the cylinder must also be altered, so that a different kind of this type of pressurized air cylinder is needed.

In German Pat. No. 23 46 828, a pressure air cylinder dimensioned as a brake power motor is arranged between the ends of two brake clamps/brake levers, and the distance between these ends is scanned by a Bowden cable and is transmitted via a stop device as drive for a ratchet drive for a threaded spindle, which serves as pull rod for the brake clamp. Two nuts are threaded on oppositely threaded portions of this spindle, these being articulated on the central regions of the two brake clamps/brake levers. Here, too, the large pressure air cylinder must effectuate both the vent play as well as the clamping stroke for the disc brake, only incremental adjustment is possible, and the particular translational ratio of the brake clamp influences the adjustment control.

Thus, in the brake linkages of the two described prior art devices, rapid and energy efficient application of the vehicle friction brake does not occur prior to activation of the brake power motor.

For the purpose of such rapid and energy efficient brake application, it is known from German No. 24 650 to provide a bell crank linkage extensible by means of an auxiliary motor in the brake linkage movable by means of the brake power motor; no vent play regulator is provided at all. The effect of the bell crank linkage is influenced by the translational ratio of the brake linkage, so that it must be dimensioned in accordance with the particular brake linkage translational ratio in question. While a vent play regulator could be incorporated into this brake linkage, this would greatly increase the constructional requirements.

From German Nos. 937 291 and 1 200 343, brake linkages are known which are movable by a brake power motor and which have threaded drives switchable by couplings, and which can switch over the brake linkage from a low translation effecting rapid brake application to a high one effecting large brake clamping force, in dependency on the tension level in the brake linkage or constructively determined brake power motor strokes. However, these brake linkages have a rather complex structure including several threaded spindles, nuts, couplings and two pull rods in the H-linkage, or a retainer coupling in the braking force transmitting linkage. Thus, they do not make it possible to overcome the application stroke of the friction brakes by means of a small, isolated auxiliary motor.

German No. 1 240 116 discloses a brake linkage with isolated brake power and auxiliary motor which, at the start of braking, are pressurized through a valve in staggered time and pressure relation to each other, from the same brake pressure line. The linkage branches leading from the respective motors are couplable with one another via an automatic coupling after the brake application stroke has been traversed, so that the auxiliary motor must also accomplish the tight clamping stroke for the friction brake. For automatic adjustment of brake venting play, a special linkage regulator must be provided in the brake linkage, so that the latter becomes complex and expensive.

German No. 811 242 discloses brakes with application and fixed brake cylinders of many different kinds, assuring that the fixed brake cylinder is pressurized during braking only after application of the brake, and that venting during release also proceeds according to an appropriate sequence.

It is known, in principle, with respect to vent play regulators in brake linkages, to use radially prestressed helical springs seated on cylinder surfaces and wound at least substantially free of play, as torque transmitting one-way couplings; these springs can be wound from steel wire of rectangular cross-section.

For brake linkages with a brake shaft drive via a turn lever and causing brake clamping by means of a screw or cam drive, it is known, e.g., from German No. b 70 06 455, to couple the turn lever, via a one-way drive blocking in the turn direction to braking and a friction coupling in the form of a clamping ring arranged parallel to the one-way drive, with the brake shaft. A further, stronger friction coupling also in the form of a friction ring is arranged in series with a turn stop with play corresponding to the desired degree of venting between the brake shaft and an element retained against rotation. However, there is no provision for rapid, energy efficient brake application at the start of braking.

For the most part, pressure air cylinders are used as brake power motors and auxiliary motors, but hydraulic, electromagnetic and electromotor devices are also known for this purpose.

OBJECT OF THE INVENTION

It is an object of the invention to provide a brake linkage of the type described, which requires limited space and has a construction which is easily adapted to the particular requirements, which in particular necessitates only small strokes for both the brake power motor and the auxiliary motor, so that these can be made small and energy efficient, while still assuring precise adjustment of desired vent play and, if appropriate, also of the vent play regulator, providing in simple manner a parking brake which can easily be outfitted with a quick release device.

This object is achieved, in accordance with the invention, by activating the auxiliary motor at the start of braking prior to the brake power motor, so that the auxiliary motor upon its activation alters the length of the vent play regulator in terms of diminution of the vent play until application of the vehicle friction brake, by means of the adjustment element. The brake power motor, upon its activation, then tightly clamps the vehicle friction brake, and, at the termination of braking, simultaneously with or after decay of the activation of the brake power motor, the auxiliary motor during decay of its activation, readjusts the length of the vent play regulator in terms of the venting of the vehicle friction brake with the aid of the adjustment element, until the desired vent play is attained.

In case the adjustment element comprises a screw drive with a threaded spindle and a nut screwable thereon, one of the two screw drive portions being rotatable by the auxiliary motor via a one-way coupling, while the other screw drive portion is non-rotatable, a particularly suitable configuration of the vent play regulator is made possible.

BRIEF DESCRIPTION OF THE DRAWINGS

In order that the invention may be more clearly understood, reference will now be made to the accompanying drawings, in which several embodiments are shown for purposes of illustration, and in which:

FIG. 2 shows the pull rod of the brake clamp of FIG. 1;

FIG. 3 is a section view of the pull rod along line III—III of FIG. 2;

FIG. 8 shows a further embodiment of the pull rod; and

FIG. 9 is a view of the pull rod according to FIG. 8.

DESCRIPTION OF THE PREFERRED EMBODIMENT

Figure 1:
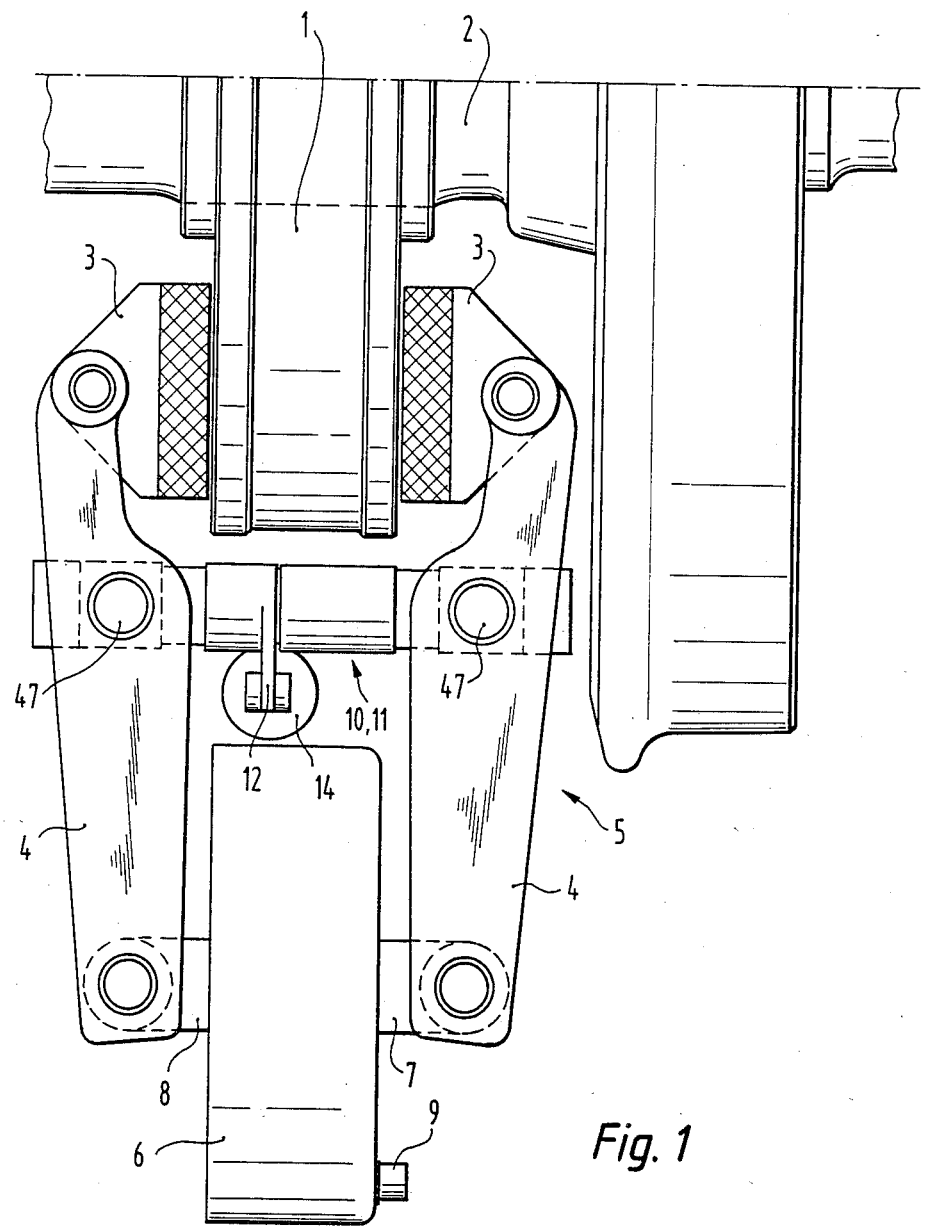
FIG. 1 shows a brake linkage in the form of a brake clamp for a piston brake.

FIG. 1 shows a portion of a rail vehicle brake set 2 provided with a brake disc 1. On both sides of brake disc 1, brake clamps 3 articulated to the ends of brake clamp levers 4 of a brake linkage in the form of brake clamp 5 are applied. At their other ends, the two brake clamp levers 4 are articulated to a bearing lug 7 connected to the cylinder body of a brake cylinder 6, or to the piston rod 8 of said brake cylinder. The latter, which constitutes a brake power motor and is dimensioned accordingly, is conventionally attached to the vehicle either rigidly or floatingly, and is charged through a pipe connection 9 with braking air pressurized according to the desired degree of braking, to cause extension of piston rod 8.

In their central regions, between the two end articulations, the two brake clamp levers 4 are flexibly joined to one another by a pull rod 11 in the form of a vent play regulator 10, which is actuated by means of a radially projecting turn lever 12.

Up to this point, the brake linkage for the brake actuation of a disc brake corresponds to that disclosed in German No. 23 46 828, and thus need not be described further.

The end of turn lever 12 is connected to the piston rod of a pressurized air cylinder 14 by a lever 13 extending substantially perpendicularly to the drawing plane according to FIG. 1. Cylinder 14 is substantially smaller than brake cylinder 6, and constitutes an auxiliary motor. Cylinder 14 is connected parallel to pipe connection 9 via a pipe conduit (not shown) to the pipe conduit carrying the brake pressure air (also not shown). Both pressurized air cylinder 24 and brake cylinder 6 are provided with a return spring (not shown), which bias the pistons of these cylinders in uncharged condition to an end rest position, and retain them in such position. These piston return springs are so dimensioned that, when the pressure of the brake pressure air increases from atmospheric pressure, the piston of pressurized air cylinder 14 is displaced first, and only at the end of its movement, i.e., when the brake pressure air reaches a higher pressure level, the piston of brake cylinder 6 is displaced.

FIGS. 2 and 3 show that vent play regulator 10 forms pull rod 11. Turn lever 12 is swingably supported on a cylindrical segment 16 of a threaded spindle 17 by means of a bearing lug 15, which is secured against axial displacement (to the left in FIG. 3) by a guide ring 18 located in segment 16. In addition, bearing lug 15 is provided with an extension 20 having an outer cylindrical surface 19, which frontally abuts a casing portion 21 rigidly connected with segment 16 in order to prevent axial displacement. Casing portion 21 has a cylindrical surface 22 of the same diameter and similar axial extent as abutting cylindrical surface 19, and terminates in an annular flange 23. A radially inwardly pre-tensioned helical spring 24 extending from bearing lug 15 to annular flange 23 is seated on cylindrical surfaces 19 and 22; this spring may be wound substantially free of play from steel wire of rectangular cross-section. The end of spring 24 facing annular flange 23 is connected with the latter by a pin 25, which can engage in a recess of the spring near its end, or can simply overlap the facing end surface of the wire winding of the spring. As a variant, the end of the helical spring could be bent at right angles and could be secured by engagement in a bore of annular flange 23 or casing portion 21.

Figure 4:
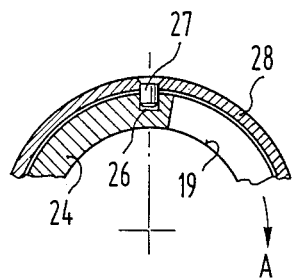
FIGS. 4 to 6 show details of the pull rod according to FIG. 3.

Adjacent its other end, the steel wire of helical spring 14 is provided with a transverse slot 26 extending from the outer circumference of the spring. A pin 27 engages from radially outwardly in slot 26, this pin being secured in a casing 28 extending from bearing lug 15 to annular flange 23 and being rotatably supported on these. Casing 28 constitutes a device which is rotatable at will, while the other end of helical spring 24 is coupled against rotational movement to threaded spindle 17. FIG. 4 shows in enlarged section view the connection of casing 28 to helical spring 24 by means of pin 27.

Figure 5:
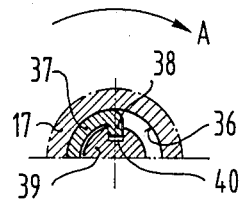

At both of its ends, spindle 17 has screw threaded portions 29, 30 having opposite screw threads 31, 32. A nut 33 is screwed on portion 29 (shown at the left of FIG. 3), while a nut 34 is screwed on portion 30 (shown at the right of FIG. 3). In the region of portion 29, spindle 17 has a recess 35 with an inner cylinder surface 36 as a partition. A radially outwardly pre-stressed helical spring 37 bears against cylinder surface 36, this spring also being wound substantially free of play from steel wire which is rectangular in cross-section, but being substantially smaller and weaker than helical spring 24. The end of helical spring 37 facing the end of threaded spindle 17 is provided with a radially inwardly extending offset portion 38. A bolt 39 constituting an intermediate part axially displaceably engages in recess 35, this rod being provided with a longitudinal slot 40 slidably engaged by offset portion 38. FIG. 5 shows this engagement in enlarged detail. The inner diameter of helical spring 37 has a small radial play with respect to the outer diameter of bolt 39, which has a transverse pin 41 at its end projecting from threaded spindle 17. The ends of this pin projecting from rod 39 engage with a predetermined rotational play x in transverse slots 42 in a casing extension 43 overlapping bolt 39 of cover-like end cap 44 closing off nut 33 at its end projecting from threaded spindle 17.

Figure 6:
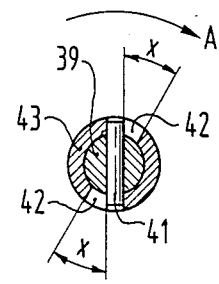

FIG. 6 shows this engagement of transverse pin 41 in longitudinal slot 40 by means of a sectional view through bolt 39 and casing extension 43. End cap 44 is rigidly connected with nut 33 by means of screw couplings 45. The other screw threaded portion 30 as well as the associated nut 34 are simply formed, without recess 35, helical spring 37, rod 39 or casing extension 43.

Threaded spindle 17 and nuts 33 and 34 jointly form a screw drive, through which the distance between nuts 33 and 34 is adjustable by rotation of spindle 17.

Each of nuts 33 and 34 carries at its outer side two coaxial bearing bolts 47 extending perpendicularly to axis 46 of threaded spindle 17, as shown particularly in FIG. 2. The brake clamp levers 4, formed as double levers, are in each case supported on bearing bolts 47, as shown in FIG. 1. The configuration of brake clamp levers as double levers, and their support on bearing bolts, is conventional for brake clamps, and is disclosed, e.g., in above-mentioned German No. 23 46 828. No further elucidation is therefore necessary.

The winding direction of helical spring 24 is such that, upon movement of turn lever 12 through pressure air loading of pressurized air cylinder 14, helical spring 24, carried along by friction closure on cylindrical surface 19, tends to contract and thereby to augment its radial application to cylindrical surfaces 19 and 22. This causes turn lever 12 to be coupled against rotation in this direction with threaded spindle 17, and to carry along the latter. In the opposite turning direction of lever 12, by contrast, helical spring 24 is loaded in opening direction, causing its frictional engagement with cylindrical surfaces 19 and 22 to loosen, and enabling it to carry along threaded spindle 17 with only slight frictional force, forming a frictional coupling. Thus, helical spring 24, in combination with cylindrical surfaces 19 and 22, forms a one-way coupling bridged by a frictional coupling. FIGS. 4 to 6 show the rotational direction of turn lever 12 for blocking this one-way coupling at arrow A. The pitch of screw threadings 31 and 32 is so selected that, upon rotation of turn lever 12 resulting from pressure air loading of pressurized air cylinder 14, and the carrying along of threaded spindle 17 due to the blocking one-way coupling, the distance between nuts 33 and 34 is reduced.

Helical spring 37 has a winding direction which, upon rotation of threaded spindle 17 in the direction of shortening the distance between nuts 33 and 34, causes contraction of spring 37 through frictional engagement with cylinder surface 36, so that this engagement is at least substantially reduced. In the opposite rotational direction of spindle 17, by contrast, helical spring 37 is loaded in the opening direction, causing it to press more strongly against cylinder surface 36. However, spring 37 is so dimensioned that, when the torque acting on spindle 17 is correspondingly great, spring 37, which is held by offset portion 38, slides through against cylinder surface 36. Thus, helical spring 37 also constitutes a one-way coupling between threaded spindle 17 and rod 39, this being bridged by a frictional coupling.

Transverse pin 41, carried with rotational play in transverse slots 42, constitutes a rotational stop whose rotational play x corresponds to a rotation of threaded spindle 17, which in turn corresponds to a change in the distance between nuts 33 and 34 translated through brake clamp levers 4 corresponding to the desired vent stroke of brake shoes 3 of brake disc 1 in brake release condition.

The brake linkage described thus far operates as follows:

If braking is initiated starting from release condition of the friction brakes according to FIG. 1, with brake shoes 3 removed from brake disc 1 by a desired release lift, then the brake pressure air, rising in pressure and conducted to brake cylinder 6 and pressure air cylinder 14, first moves the piston of cylinder 14, causing the same to rotate turn lever 12 via lever 13 in blocking direction of helical spring 27. Threaded spindle 17 is carried along by turn lever 12 and shortens the distance between nuts 33 and 34. Bolt 39 is carried along by friction of helical spring 37 with cylinder surface 36, transverse pin 41, which initially occupies the end position in transverse slots 42 shown in FIG. 6, being rotated in the direction of arrow A. The two brake clamp levers 4 thereby approach one another, until brake shoes 3 are applied to brake disc 1. At this very moment, transverse pin 41 has turned in transverse slots 42 by the amount of play x, so that it occupies its other end position. The piston of cylinder 14 comes to rest, since it is not capable of pressing brake shoes 3 via the screw drive with great force against brake disc 1. During subsequent increase in the brake air pressure, the piston of brake cylinder 6 is also moved, causing the ends of brake lever 4 remote from the brake shoes to be spread apart, the two brake levers 4 to rotate about their articulations to nuts 33 and 34, to load the pull rod 11 with vent play regulator 10 in the pull direction, and to apply brake shoes 3 to brake disc 1 with correspondingly great force, so as to cause braking. The parts of regulator 10 no longer move relative to each other. By appropriate choice of pitch of screw threads 31 and 32, the torque load acting on threaded spindle 17 through pull loading of pull rod 11 is kept so small that cylinder 14 is able to retain turn lever 12 in its position.

Upon subsequent brake release, correspondingly opposite steps take place. However, the return movement of the pistons of brake cylinder 6 and pressure air cylinder 14 need not be staggered in time, but may occur simultaneously. At the end of the brake release, the two brake shoes 3 are again in position to produce the desired vent stroke, before brake disc 1.

In the event that the distance of brake shoes 3 from brake disc 1 at the start of braking exceeds the desired vent play, braking is initiated as described, but brake shoes 3 are not yet applied to brake disc 1 after rotation of transverse pin 41 by the amount x. Thus, the pressure air cylinder can further rotate threaded spindle 17 via turn lever 12 and the blocking helical spring 24, but now bolt 39 is prevented from further rotating by transverse pin 41 abutting the ends of transverse slot 42, and is thus retained. This causes helical spring 37 retained by offset portion 38 to diminish its frictional connection to cylinder surface 36, and to slide through with respect to the latter. This process continues until, due to further approach of nuts 33 and 34 to one another through brake clamp levers 4, brake shoes 3 are pressed against brake disc 1. Further braking proceeds as described.

During subsequent brake release, brake cylinder 6 first reduces the pressure of brake shoes 3 against brake disc 1 to the point of mere application thereagainst. Thereafter, the piston of pressure air cylinder 14 is moved back by a reverse spring provided therein, turn lever 12 being correspondingly swung back. At the start, helical spring 24 carries along threaded spindle 17 through its frictional engagement with cylinder surfaces 19 and 22, the spindle in turn carrying along bolt 39 via helical spring 37 to the point of swinging by the amount of rotational play x. After travel through distance x, transverse pin 41 is stopped by the ends of transverse slot 42 and thereby prevents further rotation of bolt 39. Upon further rotational loading of threaded spindle 17, helical spring 37, which is also retained against rotation, augments its pressure against cylinder surface 36, and thereby also retains threaded spindle 17 in its attained rotational position. Upon further turning back of turn lever 12, helical spring 24 releases its frictional coupling to cylinder surfaces 19 and 22, so that, with spindle 17 immobilized, the turn lever can return to its initial position. During turning of spindle 17 about distance x, brake shoes 3 are lifted from brake disc 1 by the desired vent play, and during the subsequent turning back of turn lever 12 to its initial position with spindle 17 immobilized, the vent play in excess of the desired vent play at the start of braking is adjusted and eliminated. At the end of brake release, the brake linkage is in the position shown in FIG. 1 with brake shoes 3 lifted from brake disc 1 by the desired vent play.

If, for the purpose of replacing worn brake shoes 3 for new ones, pull rod 11, and thus vent play regulator 10 are to be set back, i.e., lengthened, casing 28 must be turned either manually or with the aid of an appropriate tool against the direction of arrow A. During this rotation, helical spring 24 is loaded in opening direction via pin 27, so that it diminishes or even loses its frictional engagement with cylinder surface 19 and is carried along in the rotational movement. This rotation is transmitted to threaded spindle 17 via pin 25 and annular flange 23, said spindle turning along with sliding of helical spring 37, held against rotation, relative to cylinder surface 36, and thereby increasing the distance between nuts 33 and 34 via screw thread portions 29 and 30. This provides space for the replacement of the brake shoes. Upon braking after such replacement, the vent play automatically adjusts to the desired value in the manner described above.

Figure 7:
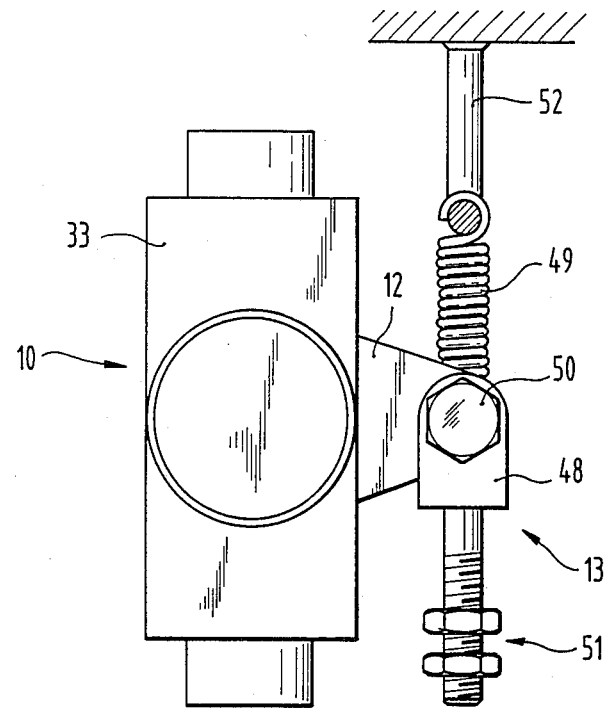
FIG. 7 is a front view of the pull rod according to FIG. 2, with articulation for the auxiliary motor.

Articulation of the pressure air cylinder 14 or any other auxiliary motor without integrated return spring can proceed as illustrated in FIG. 7. Lever 13 is articulated to turn lever 12 by means of a bearing lug 48 together with the end of a tension spring 49 by means of a bearing bolt 50. Lever 13 terminates in a screw coupling 51, serving for adjustable attachment of the power supply element of the auxiliary motor (not shown). Tension spring 49, wound against free play and extending away from turn lever 12, is suspended from a fixedly located bearing lug 52. When the auxiliary motor is not activated, tension spring 49 pulls lever 12 in the terminal position determined by its blocked condition.

The construction, operation and incorporation into the brake linkage of the vent play regulator according to FIGS. 8 and 9 are similar in principle to what has already been described, and need not therefore be further elaborated. However, nuts 33' and 34' have outer cylindrical sections 53 and 54 at their ends overlapping threaded spindle 17, and also are enclosed differently by cup-shaped end caps 55. Casing 28 is supported tightly rotatable on a short cylinder portion of turn lever 12, on the one hand, and tightly rotatable and axially displaceable on segment 54 of nut 34'. Turn lever 12 also carries a further casing 56, which is supported tightly rotatable and axially displaceable on segment 53 of nut 33'. In this manner, the entire interior of the vent play regulator according to FIGS. 8 and 9 is effectively protected against the entry of dirt and foreign matter, thereby guaranteeing particularly wear-resistant and trouble-free operation over long intervals. To simplify the manufacture, nuts 33' and 34' can be assembled from a nut element 57 containing a screw coupling for threaded spindle 34' and a casing portion 59 rigidly connected with the latter by bolts 58. The remaining reference numbers in FIGS. 8 and 9 are merely intended to facilitate comparison with FIGS. 2 and 3.

In case the brake linkage is to be provided with a parking brake, a parking brake motor of desired type, e.g., a mechanical clamp or spring-loaded brake cylinder, can be articulated to turn lever 12 parallel to pressure air cylinder 14 or otherwise designed auxiliary motor, via a coupling with play, e.g., a slotted articulation. The service braking operation described above is not influenced by this. Upon actuation of the parking brake motor, the latter first applies brake shoes 3 to brake disc 1 through rotation of turn lever 12, as in the previously described embodiment of pressure air cylinder 14. However, it then continues to rotate turn lever 12 with great force, causing nuts 33 and 34 to be drawn together with great force via the screw drive and to clamp the disc brake forcefully. During subsequent brake release, vent play regulator 10 adjusts the draw-in stroke like an over-stroke during return of turn lever 12 to its original position. However, since the draw-in stroke for the friction brake is substantially smaller than the application stroke, this adjustment is insignificant and merely produces lifting of the brake shoes 3 from brake disc 1 which is slightly below the desired vent play. Upon several immediately repeated parking brake applications, there is no further adjustment, so that the disc brake remains always releasable.

As a variant of the foregoing embodiment, the brake linkage could also be adapted as a parking brake by providing a parking brake power motor in parallel or in series with brake cylinder 6; if in series, this would preferably be as a conventional, unitary combination double brake cylinder. During parking braking, brake application could proceed by means of pressure air cylinder 14, but it is also possible for the parking brake power motor to take over the application stroke for the disc brake.

In the aforementioned parking braking, mechanical emergency release, which may be required, e.g., upon failure of the parking brake power motor, is made possible by manually turning casing 28 in such manner that helical spring 24 is loaded in opening direction via pin 27 and thereby loses its frictional contact with cylinder surface 19. Where the parking brake power motor is articulated to turn lever 12, the former can be unstressed upon further rotation of turn lever 12, until it reaches a terminal position determined by a stop and can exert no further force on turn lever 12. Following subsequent liberation of casing 28, threaded spindle 17 is then no longer loaded by torque from the parking brake power motor, so that, with a corresponding selection of the pitch of screw threads 31 and 32, tensile clamping of nuts 33 and 34 is eliminated and brake shoes 3 abut brake disc 1 without force. It may be desirable for screw threads 31 and 32 not to be self-locking.

In case the parking brake power motor is arranged to operate in series or parallel with brake cylinder 6, it is particularly desirable, for the purpose of mechanical emergency release, that screw threads 31 and 32 not be self-locking. If, as previously mentioned, casing 28 is manually rotated, the parking brake power motor can be unstressed up to its terminal stop, drawing apart nuts 33 and 34 through rotation of threaded spindle 17 via non-self-locking screw threads 31 and 32. Brake clamp 5 becomes devoid of power and brake shoes 3 loosely abut brake disc 1.

Mechanical emergency release is therefore possible in both embodiments of the parking brake without increase in the costs of manufacture.

Especially for vehicles requiring frequent actuation of the parking brake, such as subway trains, trolleys or buses, the brake linkage can be simplified by replacing, in the embodiment shown in FIG. 1, pressure air cylinder 14 by a parking brake power motor, particularly a spring-loaded brake cylinder. This obviates the need for an auxiliary motor. During ordinary service braking, however, brake cylinder 6 must then produce the application stroke for the disc brake in addition to the parking brake stroke, corresponding to the operation of conventional brake linkages, whereby, vent play adjustment obtains upon actuation of the parking brake in the form of a stroke adjustment for the total stroke. Since such parking brake actuation is frequent, such adjustment suffices also for service braking. Despite its parking braking capacity, the cost of manufacture of this brake linkage is particularly modest.

The brake linkage need not be in the form of a brake clamp according to the above-described embodiments, but can be constructed in a different manner, e.g., as a conventional H-brake linkage. In this case, the vent play regulator is arranged in a linkage element placed under tension by the braking force, and the linkage elements contiguous therewith are articulated to nuts 33 and 34. The application stroke, parking brake stroke and parking brake capabilities correspond in principle to those described in connection with the preceding embodiments, so that further discussion is unnecessary.

Without alteration in the operation of the brake linkage, the vent play regulator can be changed in various ways. For example, in the case of brake linkages not constituting brake clamps, it is possible to articulate threaded spindle 17 to a brake linkage element without nut 4 and screw threaded portion 30 by means of a conventional bearing lug and a pivot bearing. In this case, the longitudinal adjustment of the vent play regulator results solely from the screw coupling of screw threaded portion 29 without nut 33. It is also possible to provide inner cylinder surfaces for cooperation with helical spring 24, instead of outer cylinder surfaces 19 and 22. Corresponding inversions are possible on helical spring 37, so that the latter may, for example, be non-rotatably coupled to threaded spindle 17. Moreover, the one-way and friction couplings formed by helical springs 27 and/or 37 can be replaced by one-way and/or friction couplings formed from other, conventional and possibly separate components corresponding to those of the above-mentioned German No. 70 064 55. An exchange of threaded spindle and nuts is also possible, such that, instead of spindle 17, a casing-like nut driven by turn lever 12 is used, both ends of such nut being screwed to threaded spindles coupled to the linkage elements. Furthermore, the vent play regulator can also be formed entirely differently from the described embodiments, in the manner of prior art brake linkage regulators, to the extent that it is possible to couple their adjustment element with the auxiliary or parking brake power motor in such manner that, by means of such motor, brake application is possible at the start of braking through adjustment in the length of the linkage regulator.

In a departure from the initially described embodiment, a conventional delay mechanism can be provided for controlling the motion sequence of the auxiliary and brake power motors upon their connection to the same energy source. If the motors are pressure air cylinders, this delay mechanism can, e.g., comprise a switching valve delaying charging of the brake cylinder, as disclosed in German No. 1,240,116 or 811,242.

The brake power motor and the auxiliary motor need not be connected to the same energy source. For example, it is possible to provide brake cylinder 6 as brake power motor, while bearing lug 15 is not driven by turn lever 12, but rather by means of an electromotor. In the case of particular vehicles this can produce control and manufacturing advantages.

By corresponding reversal of screw threads 31 or 32, or of the one-way couplings formed by means of helical springs 24 and 37, the described vent play regulators may be so altered that they are actuated by the brake force not through pull, but through pressure. Such altered vent play regulators would be arranged in the brake linkage between two brake linkage elements loaded by brake force pressure. For example, such a vent play regulator, otherwise constructed with any of the variations mentioned above, could be integrated in the piston rod of a brake cylinder.

In a further variant of the brake linkage, it is possible to combine the brake power motor and the auxiliary motor in a single power motor or a common adjustably operable power source. At the start of braking, the operating force and the operating stroke are drawn from this energy source to drive the adjustment element; this can proceed via an intermediate element delimiting the stroke path or the operating power.

The intermediate element may be similar to a connecting link guide conventional for brake linkage adjusters, or a spring element or the like. Subsequently, the clamping force and clamping stroke for the vehicle friction brake are derived from the power source. This brake linkage has a certain similarity to German Patent Application No. P 23 46 828, but only with respect to the common source for the auxiliary power and the braking power.

What is claimed is:

1. Brake linkage for vehicle friction brake having an adjustable length vent play regulator (10) arranged between two brake linkage elements (4) and loaded by means of a brake power motor (6) with brake clamping force, said vent play regulator having adjustment means (17, 33, 34) for reducing vent play to the desired value and being driven by an auxiliary motor (14) when said desired value is exceeded, comprising
   (a) means for actuating said auxiliary motor (14) before said brake power motor (6) at the start of braking;
   (b) said auxiliary motor (14) changing the length of said vent play regulator (10) so as to diminish vent play upon its actuation through said adjustment means (17, 33, 34) until said friction brake is applied;
   (c) said brake power motor (6) subsequently upon its actuation tightly clamping said vehicle friction brake;
   (d) said auxiliary motor (14), at the end of braking upon decay of the actuation of said brake power motor (6), and upon decay of its own activation, readjusting the length of said vent play regulator (10) by means of said adjustment means (17, 33, 34) in the venting direction of said vehicle friction brake until the desired vent play is attained;
   (e) said adjustment means comprising a screw drive having as a first component a threaded spindle (17) and as a second component at least one nut (33, 34) in screw engagement therewith, one of said components being rotatably controlled by said auxiliary motor (14) by way of a one-way coupling (24) and being rotatably and axially power transmittingly articulated to one of said brake linkage elements, while the other of said components is non-rotatably controlled and is non-rotatably and axial power transmittingly articulated to the other of said brake linkage elements;
   (f) said auxiliary motor (14) engaging a turn lever (12) rotatably supported on said rotatably controlled component and coupled thereto by way of a first one-way coupling (24) blocking in the direction of brake applicaton and a first friction coupling (24) overlapping said first one-way coupling;
   (g) said rotatable component being coupled with an element (33) retained against rotation by way of a second one-way coupling (37) blocking brake venting in the direction of rotation of said rotatable component and by way of a second friction coupling (37) overlapping said second one-way coupling, and in series therewith by way of a play-containing rotational stop (41, 42), each of said friction couplings being stronger than the idling resistance in unlocking direction of the respective one-way coupling not overlapped thereby, said play (x) of said rotational stop (41, 42) corresponding to a pitch of said screw drive (17, 33, 34) which corresponds to the desired vent play;
   (h) said first one-way coupling and said first friction coupling sharing a first helical spring (24) wound to be substantially free of play, said turn lever (12) and said threaded spindle (17) having cylindrical surfaces (19, 22) on which said spring is seated to the extent of substantially at least one-half its length, said spring (24) being radially pre-stressed to abut against said cylinder surfaces, the winding direction of said spring being selected so as to cause an increase in its radial pressure against said cylinder surfaces (19, 22) upon rotation of said turn lever (12) in the direction of brake application.

2. Brake linkage according to claim 1, wherein said second one-way coupling and said second friction coupling share a second helical spring (37) wound to be substantially free of play, said rotatable component (33) or an intermediate element concentric therewith having a cylindrical surface (36) passing or overlapping said second helical spring to the extent of substantially at least one-half its length, said second helical spring (37) being radially pre-stressed to abut against said cylinder surface (36) and having an end which is axially displaceable and non-rotatable in said rotatable component (33) or said intermediate element (39), the winding direction of said second spring being selected so as to weaken its radial pressure against said cylinder surface (36) upon rotation of said rotatable component (17) in the direction of brake application, said intermediate element (39) being rotatably supported and being coupled to said element (33) retained against rotation by way of said rotational stop (41, 42).

3. Brake linkage according to claim 2, wherein said first and second helical springs (24, 37) are wound of steel wire which is rectangular in cross-section, said second helical spring (37) being smaller and weaker than said first helical spring (24).

4. Brake linkage according to claim 3, wherein said second helical spring (37) has a radially offset portion (38) at the end of its axially displaceable and non-rotatable guide, said offset portion slidably engaging in a longitudinal slot (40) in said intermediate element (39) or said rotatable component adjacent said end of said second spring.

5. Brake linkage according to claim 1, wherein said second one-way coupling (37) has a limited blocking torque which can be overcome by random rotation of said rotatable component.

6. Brake linkage according to claim 1, wherein said first helical spring (24) is coupled on the side of said turn lever (12) with a randomly rotatable rotation device (28) and is otherwise fixed against rotation with respect to said rotatable component (17).

7. Brake linkage according to claim 6, wherein said cylinder surfaces (19, 22) penetrate through said first helical spring (24), and wherein said rotation device comprises a casing (28) overlapping said spring.

8. Brake linkage according to claim 1, wherein said rotatable component comprises said threaded spindle (17), said spindle having adjacent both of its ends oppositely threaded screw thread portions (29, 30) each screwed to a nut (33, 34), one (33) of said nuts being non-rotatably articulated to one (4) of said brake linkage elements and the other (34) of said nuts being non-rotatably articulated to the other (4) of said brake linkage elements, said brake linkage constituting a brake clamp (5) and said articulations being located in the center regions of said brake linkage elements (4).

9. Brake linkage according to claim 7, wherein said turn lever (12) is supported adjacent the center of said threaded spindle (17), and has a casing (28, 56) extending to each of said nuts (33', 34') provided with closed end caps (55), said casing being tightly rotatably and axially displaceably supported on said nuts, one (28) of said casings, simultaneously constituting said rotation device, having its other side tight with and rotatable on said turn lever (12).

10. Brake linkage according to claim 1, wherein a tension spring (49) braced by a stop effective in brake release position acts on said adjustment means in opposition to said auxiliary motor (14).

11. Brake linkage according to claim 1, wherein said brake power motor (6) and said auxiliary motor (14) are connected to the same adjustable energy source, said auxiliary motor being responsive at a lesser energy supply level than said brake power motor.

12. Brake linkage according to claim 1, wherein said brake power motor (6) and said auxiliary motor (14) are pressure air cylinders.

13. Brake linkage according to claim 1, wherein said brake power motor and said auxiliary motor have a common power source from which is derived at the start of braking the actuating force and stroke for driving said adjustment means by way of an intermediate element which delimits the stroke path and actuating force, and which susequently provides the clamping force and clamping stroke for said vehicle friction brake.

14. Brake linkage according to claim 1, wherein said brake linkage comprises a brake clamp (5) for a rail vehicle disc brake, and wherein said vent play regulator is a pull rod (11) of said disc brake.

* * * * *